United States Patent
Zhang (10) Patent No.: US 11,408,746 B2
(45) Date of Patent: Aug. 9, 2022

(54) SYSTEMS AND METHODS FOR GENERATING ATTRIBUTES-BASED RECOMMENDATIONS

(71) Applicant: Toyota Connected North America, Inc., Plano, TX (US)

(72) Inventor: Dingchao Zhang, Plano, TX (US)

(73) Assignee: Toyota Connected North America, Inc., Plano, TX (US)

( * ) Notice: Subject to any disclaimer, the term of this patent is extended or adjusted under 35 U.S.C. 154(b) by 275 days.

(21) Appl. No.: 16/703,214

(22) Filed: Dec. 4, 2019

(65) Prior Publication Data

US 2021/0172752 A1    Jun. 10, 2021

(51) Int. Cl.
*G01C 21/34* (2006.01)
*G06F 16/29* (2019.01)
*G06N 3/04* (2006.01)

(52) U.S. Cl.
CPC ..... *G01C 21/3484* (2013.01); *G01C 21/3446* (2013.01); *G06F 16/29* (2019.01); *G06N 3/04* (2013.01)

(58) Field of Classification Search
CPC ....... H04W 4/185; H04W 4/021; H04W 4/40; G06N 3/0454; G06N 3/08; G06N 3/088; G07C 5/0841; G07C 5/008; G06F 16/29
See application file for complete search history.

(56) References Cited

U.S. PATENT DOCUMENTS

| 9,430,858 B1* | 8/2016 | Har | G01C 21/32 |
| 10,353,975 B2* | 7/2019 | Oh | G06F 16/9535 |
| 2014/0274022 A1* | 9/2014 | Bell | G06F 16/951 |
| | | | 455/418 |

(Continued)

FOREIGN PATENT DOCUMENTS

WO    2018148493 A1    8/2018

OTHER PUBLICATIONS

Unknown, "Word2vec," https://en.wikipedia.org/wiki/Word2vec (Last accessed Dec. 4, 2019, 6 pages).

(Continued)

*Primary Examiner* — Rami Khatib
*Assistant Examiner* — Gabriel J Lambert
(74) *Attorney, Agent, or Firm* — Christopher G. Darrow; Darrow Mustafa PC (57) ABSTRACT

System, methods, and other embodiments described herein relate to generating a recommendation for a destination or a route based on desired attributes. In one embodiment, a method of generating a recommendation responsive to one or more requested attributes, includes generating a location tensor associated with a geographical location, the location tensor being a multidimensional datastructure that indicates one or more attributes of the geographical location, extracting, from the location tensor, an embedding that indicates information contained in the location tensor, storing the embedding in a database in association with the geographical location, analyzing a plurality of embeddings in the database to identify at least one geographic area having attributes that correspond with the one or more requested attributes, and generating a recommendation that includes the at least one geographic area.

20 Claims, 7 Drawing Sheets

(56) References Cited

U.S. PATENT DOCUMENTS

| | | | |
|---|---|---|---|
| 2015/0088853 A1* | 3/2015 | McDonald | G06F 16/444 |
| | | | 707/711 |
| 2016/0247061 A1 | 8/2016 | Trask et al. | |
| 2016/0342865 A1* | 11/2016 | Tang | G06K 9/42 |
| 2016/0350834 A1 | 12/2016 | Wilson et al. | |
| 2017/0236411 A1* | 8/2017 | Sumers | G06K 9/6293 |
| | | | 701/117 |
| 2018/0090128 A1 | 3/2018 | Kurata et al. | |
| 2019/0035101 A1* | 1/2019 | Kwant | G06N 3/0454 |
| 2019/0130305 A1 | 5/2019 | Sivertson | |
| 2019/0242714 A1* | 8/2019 | Shaked | G06F 16/909 |
| 2019/0325642 A1* | 10/2019 | Martinet | G06F 16/90328 |
| 2019/0370346 A1* | 12/2019 | Xu | G06F 16/447 |
| 2020/0065629 A1* | 2/2020 | Kennedy | G06K 9/6215 |
| 2020/0209872 A1* | 7/2020 | Xu | G05D 1/0088 |

OTHER PUBLICATIONS

Unknown, "Cluster analysis," last accessed on Jan. 13, 2022, 22 pages, found at https://en.wikipedia.org/w/index.php?title=Cluster_analysis&oldid=1065378878.

* cited by examiner

SYSTEMS AND METHODS FOR GENERATING ATTRIBUTES-BASED RECOMMENDATIONS

TECHNICAL FIELD

The subject matter described herein relates to systems and methods for generating a destination and/or routing recommendation, and, more particularly, for generating a recommendation in response to a query that includes preferred attributes of a destination and/or route.

BACKGROUND

Conventional recommendation systems may allow a user to request directions to a nearest point-of-interest (POI), such as a nearest gas station or a nearest name brand restaurant. Such recommendation systems may rely on a map database or lookup table that includes various POIs encoded by location coordinates. However, in some circumstances a user may not have a definite idea of a specific POI that the user would like to visit, but instead may have preferred attributes (e.g., I'm allergic to pollen and would prefer a shopping area that avoids trees) that the user desires in a recommended route or location. In this case a conventional recommendation system may be inadequate to meet the needs of the user.

SUMMARY

In one embodiment, example systems and methods are disclosed for generating a destination and/or routing recommendation, in response to a query, based at least in part on learned attributes of multiple locations within a region. The query can request desired attributes rather than specific locations (e.g., addresses) or POIs (e.g., nearest gas station).

Therefore, a new georecommendation system is disclosed. In one approach, the disclosed system includes one or more processors, a memory communicably connected to the one or more processors and storing a data module including one or more instructions that, when executed by the one or more processors, cause the one or more processors to generate a location tensor associated with a geographical location, the location tensor being a multidimensional datastructure that indicates one or more attributes of the geographical location, an encoding module including one or more instructions that, when executed by the one or more processors, cause the one or more processors to extract, from the location tensor, an embedding that indicates information contained in the location tensor, and store the embedding in a database in association with the geographical location, and a recommendation module including one or more instructions that, when executed by the one or more processors, cause the one or more processors to analyze a plurality of embeddings in the database created by the encoding module to identify at least one geographic area having attributes that correspond with the one or more requested attributes and generate a recommendation that includes the at least one geographic area.

In one embodiment a method of generating a recommendation responsive to one or more requested attributes is disclosed. The method includes generating a location tensor associated with a geographical location, the location tensor being a multidimensional datastructure that indicates one or more attributes of the geographical location, extracting, from the location tensor, an embedding that indicates information contained in the location tensor, storing the embedding in a database in association with the geographical location, analyzing a plurality of embeddings in the database to identify at least one geographic area having attributes that correspond with the one or more requested attributes, and generating a recommendation that includes the at least one geographic area.

In one embodiment, a non-transitory computer-readable medium is disclosed. The computer-readable medium stores instructions that when executed by one or more processors cause the one or more processors to perform the disclosed functions. The instructions include instructions to generate a location tensor associated with a geographical location, the location tensor being a multidimensional datastructure that indicates one or more attributes of the geographical location; extract, from the location tensor, an embedding that indicates information contained in the location tensor; store the embedding in a database in association with the geographical location; analyze a plurality of embeddings in the database to identify at least one geographic area having attributes that correspond with the one or more requested attributes; and generate a recommendation that includes the at least one geographic area.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with generating a recommendation for a destination or route based on attributes of a geographic location. The attributes can include, for example, geographic terrain features (e.g., river, wooded, grassy, etc.), any POI present (e.g., restaurant, store, etc.) and vehicle actions (e.g., fast driving, swerving, etc.).

In one or more disclosed embodiments, a system that will be referred to herein as a 'georecommendation system' can encode attribute data, which may be associated with a geographic location and include POI data, terrain data and vehicle telematic data, to extract compressed embeddings that indicate various attributes of a given location. The attribute data can be associated with a geographical location. The POI data can include labeled data that describe one or more points of interest at the geographical location. The terrain data can include digitized map data and/or labeled data that describe one or more terrain features present at the geographical location. The telematic data can include vehicle descriptive data, such as make, model, year, etc., as well as vehicle sensor data.

In one or more disclosed embodiments, the georecommendation system can store the embeddings in association with geographic locations. As will be discussed in detail below, the georecommendation system can analyze the stored embeddings to respond to a query requesting a recommendation based on desired attributes instead of requesting directions to a known address or location.

Figure 1:
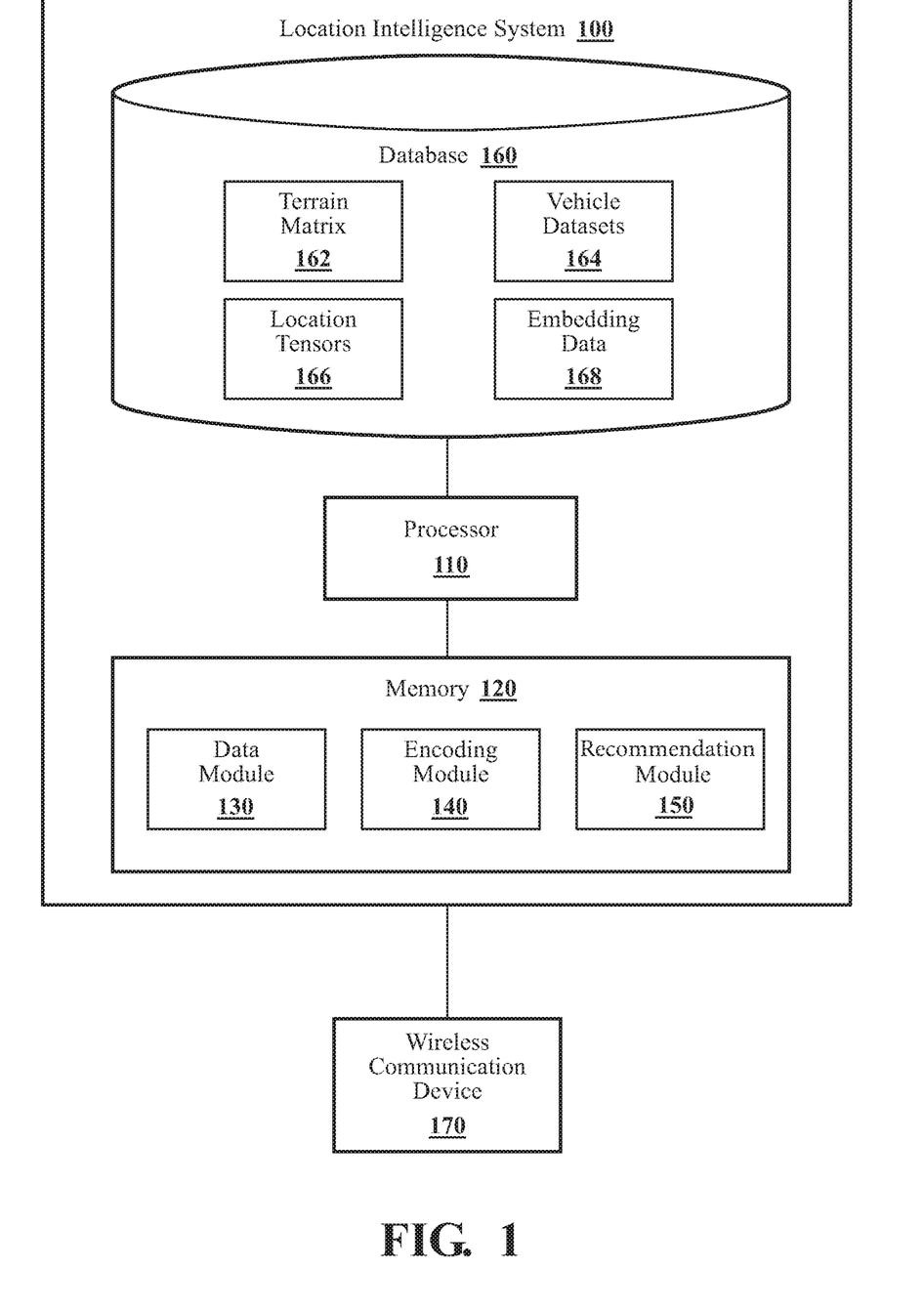
FIG. 1 illustrates an embodiment of a georecommendation system according to the disclosed subject matter.

Referring to FIG. 1, one embodiment of a georecommendation system 100 is illustrated. While arrangements will be described herein with respect to the georecommendation system 100, it should be understood that the disclosed embodiments are not limited to a unitary system as illustrated. In some implementations, the georecommendation system 100 may be embodied as a cloud-computing system, a cluster-computing system, a distributed computing system (e.g., across multiple facilities), a software-as-a-service (SaaS) system, and so on. Accordingly, the georecommendation system 100 is illustrated and discussed as a single computing system which may be disposed in a central server for purposes of discussion, but should not be interpreted to limit the overall possible configurations in which the disclosed components may be configured. For example, the separate modules, memories, databases, and so on may be distributed among various computing systems in varying combinations.

The georecommendation system 100 includes various elements. It should be understood that in various embodiments and configurations, depending on the actual layout and implementation, it may not be necessary for the georecommendation system 100 to include all of the elements shown in FIG. 1. The georecommendation system 100 can have any combination of the various elements shown in FIG. 1. Further, the georecommendation system 100 can have additional elements to those shown in FIG. 1. In some arrangements, the georecommendation system 100 may be implemented without one or more of the elements shown in FIG. 1. Further, while the various elements are shown as being located within the georecommendation system 100 in FIG. 1, it will be understood that one or more of these elements can be located external to the georecommendation system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The georecommendation system 100 can be associated with one or more vehicles and implemented to perform methods and other functions as disclosed herein relating, for example, to obtaining multiple types of attributes data associated with geographic locations, encoding the attributes data, extracting embeddings from the encoded data, and analyzing the embeddings to generate a recommendation in response to a query that includes a request for a destination/route that has certain attributes (e.g., a route that passes by a lake, a shopping area with trees, etc.). The noted functions and methods will become more apparent with a further discussion of the figures.

The georecommendation system 100 is shown as including a processor 110. In various implementations the processor 110 may be a part of the georecommendation system 100, the georecommendation system 100 may access the processor 110 through a data bus or another communication pathway, the processor 110 may be a remote computing resource accessible by the georecommendation system 100, and so on. In any case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the georecommendation system 100 includes a memory 120 that stores a data module 130, an encoding module 140 and a recommendation module 150. The memory 120 is a random-access memory (RAM), read-only memory (ROM), a hard-disk drive, a flash memory, or other suitable memory for storing the modules 130, 140 and 150. The modules 130, 140 and 150 are, for example, computer-readable instructions that when executed by the processor 110 cause the processor 110 to perform the various functions disclosed herein, as will be described further below. In various embodiments, the modules 130, 140 and 150 can be implemented in different forms that can include but are not limited to hardware logic, an ASIC, components of the processor 110, instructions embedded within an electronic memory, and so on.

With continued reference to the georecommendation system 100, in one embodiment, the system 100 includes a data store 160, which may be implemented as a database 160. The database 160 is, in one embodiment, an electronic data structure that may be stored in the memory 120 or elsewhere, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140 and 150 in executing various determinations. In one embodiment, the database 160 stores data including terrain matrices 162, vehicle datasets 164, location tensors 166 and embedding data 168.

The georecommendation system 100 can also include or be operably connected to a wireless communication device 170 that allows the data module 130 to communicate, for example, with vehicle systems, external computing devices, communication networks, and other systems. The communication device 170 can be configured to communicate, for example, over a local area network, a wide area network (e.g., the Internet), directly with a target system via an established protocol such as Bluetooth™, WiFi™, infrared (IR), vehicle-to-everything (V2X), cellular networks, or through other communications methods.

Referring back to the modules 130, 140 and 150, the data module 130 can be constructed including instructions that function to control the processor 110 to: 1) obtain, from a map, a section of rasterized image data associated with a geographical location and convert the rasterized image data into a multidimensional terrain matrix 162, 2) receive a plurality of datasets 164 from a plurality of vehicles, the datasets 164 being associated with the geographical location and respectively including at least feature data that indicate a status of at least one respective feature of the respective vehicles, and 3) cause the processor 110 to combine the plurality of datasets 164 and the multidimensional terrain matrix 162 to form a location tensor 166 associated with the geographical location.

The encoding module 140 can be constructed including instructions that function to extract, from a location tensor 166, an embedding 168 that represents the location tensor 166. For example, in one or more embodiments the encoding module 140 can reduce a dimensionality of a location tensor 166 to create the embedding 168. The encoding module 140 can store the embedding 168 in the database 160. Furthermore, the encoding module 140 can extract and store a plurality of embeddings 168 from a plurality of location tensors 166 associated with various locations.

The recommendation module 150 can be constructed including instructions that function to analyze, in response to a query, embeddings 168 stored in the database 160 to identify a region that corresponds with attributes contained in the query and generate a recommendation based on the region. In one or more embodiments, the query can include specific attributes that a user is looking for in a recommendation, as opposed to an address or categorical POI (e.g., gas station), which is included in conventional queries. For example, a user of the disclosed georecommendation system 100 who has allergies can input a query (i.e., verbally or through an input interface) requesting a recommendation for a restaurant that is not located near trees. In another example, a user who would like to fish can request a recommendation for a campsite that has a lake, etc.

In one or more embodiments the map utilized by the data module 130 can be a topographic map, satellite map, or other type of map that shows terrain features, such as rivers, lakes, vegetation, forests, etc. The map can cover a given region, such as a metropolitan area, a county, a state, etc.

Figure 2:
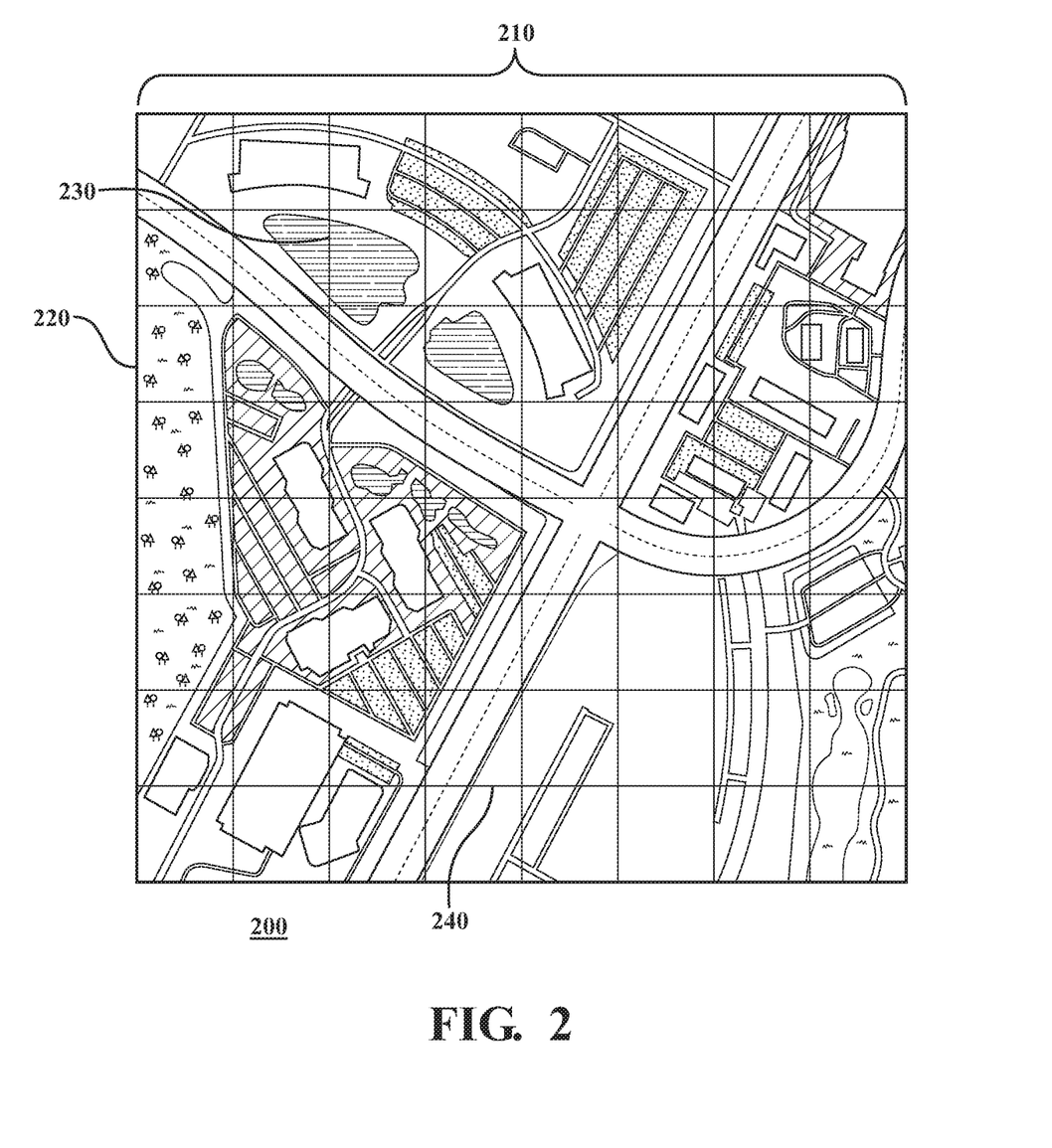
FIG. 2 illustrates an example map according to the disclosed subject matter.

FIG. 2 shows an example map 200. The map 200 can be divided into a plurality of sections 210 which may be formed, for example, as 100-meter blocks or delineated using a different shape and/or increment. The map 200 can include different colors or patterns to indicate different terrain features. For example, the color/pattern of section 220 can indicate a forest at that map location, the color/pattern of section 230 can indicate a lake at the location, the color/pattern in section 240 can indicate a road, and so on.

Figure 3:
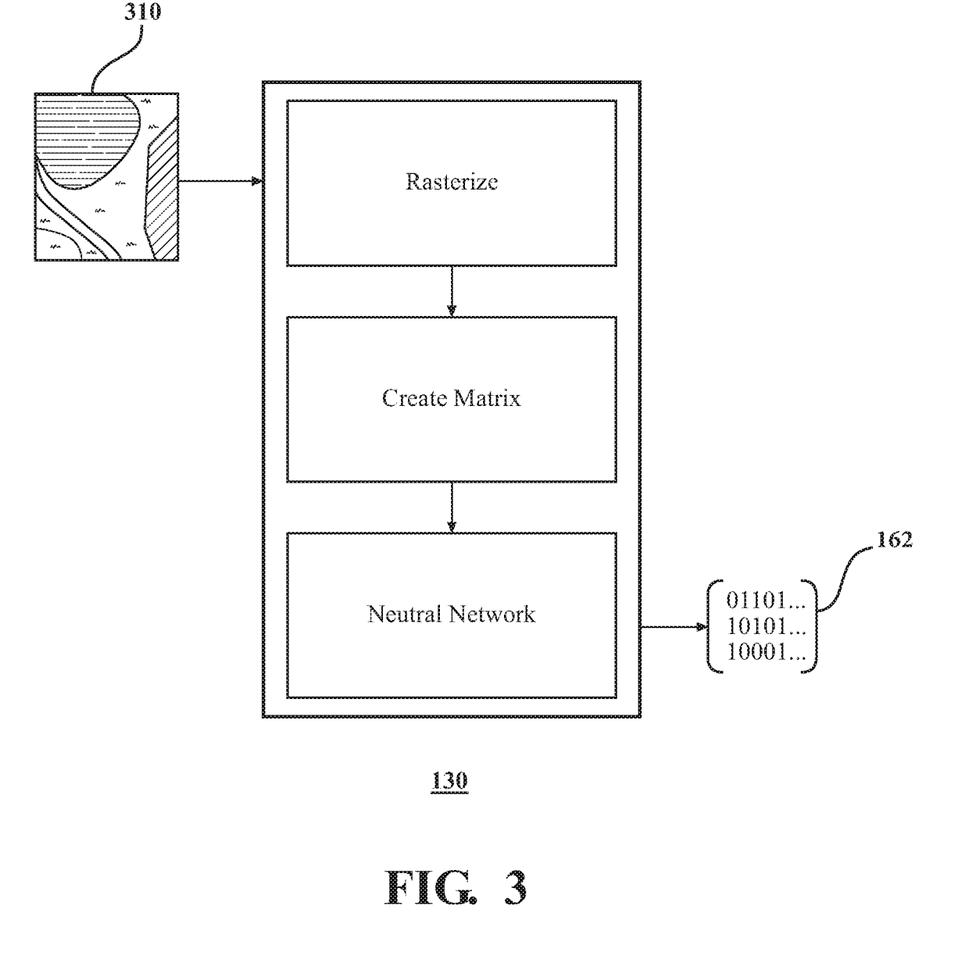
FIG. 3 illustrates an implementation of a data module according to the disclosed subject matter.

FIG. 3 shows an example implementation of the disclosed data module 130 processing a section 310 of the map 200. The data module 130 can rasterize the section 310 and convert the pixel values into a multidimensional terrain matrix 162. For example, the size of the section 310 can be predetermined, e.g., 50 pixels×50 pixels, with each pixel having red, green and blue (RGB) values. In this example the terrain matrix 162 dimensions would be 50×50×3. However, the disclosed embodiments can use different dimensions and different color schemes depending upon implementation.

The values of the terrain matrix 162 capture information that indicates features of the geographical region that the section 310 is associated with. In one or more embodiments the data module 130 can use a machine learning algorithm, such as a neural network, to identify which features are associated with the terrain matrix 162 values.

In one or more embodiments, the data module 130 can use a neural network trained to classify terrain features in the map 200. The neural network can be trained on a training set that includes matrix values of a plurality of sections of the map 200 that are labeled for terrain features. For example, section 220 can be labeled 'forest,' section 230 can be labeled 'lake,' section 240 can be labeled 'road,' and so on. A section can have multiple labels assigned when multiple terrain features are present. For example, labels 'pond' and 'forest' may both be assigned to a section that includes a pond in a forest. By training the neural network on the training set matrices, the neural network can learn relationships between terrain features and corresponding colors/patterns/shapes of the map 200 represented in the terrain matrices.

Thus, when a terrain matrix 162 is based on unlabeled map image data, the data module 130 can use the neural network to determine one or more labels for the terrain matrix 162. For example, for a region of a map that is unlabeled (or unknown, for example, if the system 100 is being deployed in a new city after having been trained on map data from a previous city), the data module 130 can rasterize a section of the map, convert the rasterized image into a terrain matrix 162, then input the terrain matrix 162 into the trained neural network to receive one or more terrain feature labels as output. The data module 130 can encode the label(s) as part of the terrain matrix 162 (e.g., a row in the terrain matrix 162 represents encoded label information) or otherwise store the label information in association with the terrain matrix 162, e.g., as metadata.

In addition to terrain data, the map may include POI data, for example, in an associated POI database which includes coordinates of POIs to be displayed on the map. The POI data can include, for example, coordinates for gas stations, restaurants, stores, etc., as well as the corresponding names and accompanying information, such as street address, website, phone number, etc. When the data module 130 generates the terrain matrix 162 for a section of the map, the data module 130 can also extract and encode any POI data associated with the section and store the POI encoding as part of the terrain matrix 162 data or otherwise in association with the terrain matrix 162, for example, as metadata associated with the terrain matrix 162.

In one or more embodiments, the data module 130 can receive one or more datasets 164 from one or more vehicles, the dataset(s) 164 being associated with a geographical location through which the one or more vehicles travelled. The dataset(s) 164 can include vehicle description information (e.g., make, model, year, etc.) and/or feature data that indicates a status of a feature of the vehicle, such as telematic data obtained (from one or more sensors installed on the vehicle) as the vehicle travelled through the geographic location. In one or more embodiments, the feature data can include a minimum and maximum sensor value of one or more sensors installed on the vehicle, spanning a predetermined time window (e.g., one second, ten seconds, one minutes, ten minutes, etc.). As will be discussed further below, the feature data information can indicate one or more actions executed by the vehicle.

The data module 130 can store the dataset(s) 164 in the database 160 in association with the geographic location and the terrain matrix 162 that corresponds to the geographic location. The data module 130 can receive datasets 164 from multiple vehicles, each dataset 164 including respective vehicle description information and telematic data and each dataset 164 being associated with respective geographic locations. The data module 130 can therefore collectively store a plurality of datasets 164 in the database 160, each in association with respective geographic locations and corresponding terrain matrices 162. The data module 130 can further include instructions that function to control the processor 110 to combine, for a given location, one or more datasets 164 associated with the location with a terrain matrix 162 associated with the location to create a multidimensional location tensor 166 that includes terrain information and vehicle action information for the given location.

Figure 4:
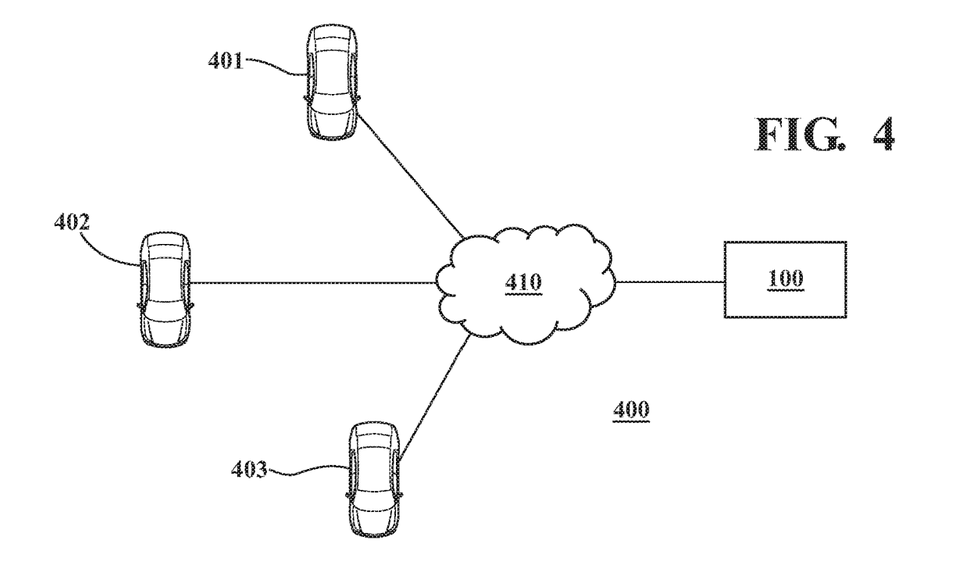
FIG. 4 illustrates an example setting that can implement a georecommendation system according to the disclosed subject matter.

FIG. 4 illustrates an environment 400 that can implement the disclosed georecommendation system 100. In one or more embodiments the georecommendation system 100 is implemented within a computing device (e.g., a server) having access to a network 410 (e.g., a wide-area network (WAN), the Internet, etc.). A plurality of vehicles 401, 402, 403 likewise have access to the network 410 and can transmit datasets 164 to the georecommendation system 100 via the network 410.

Figure 5:
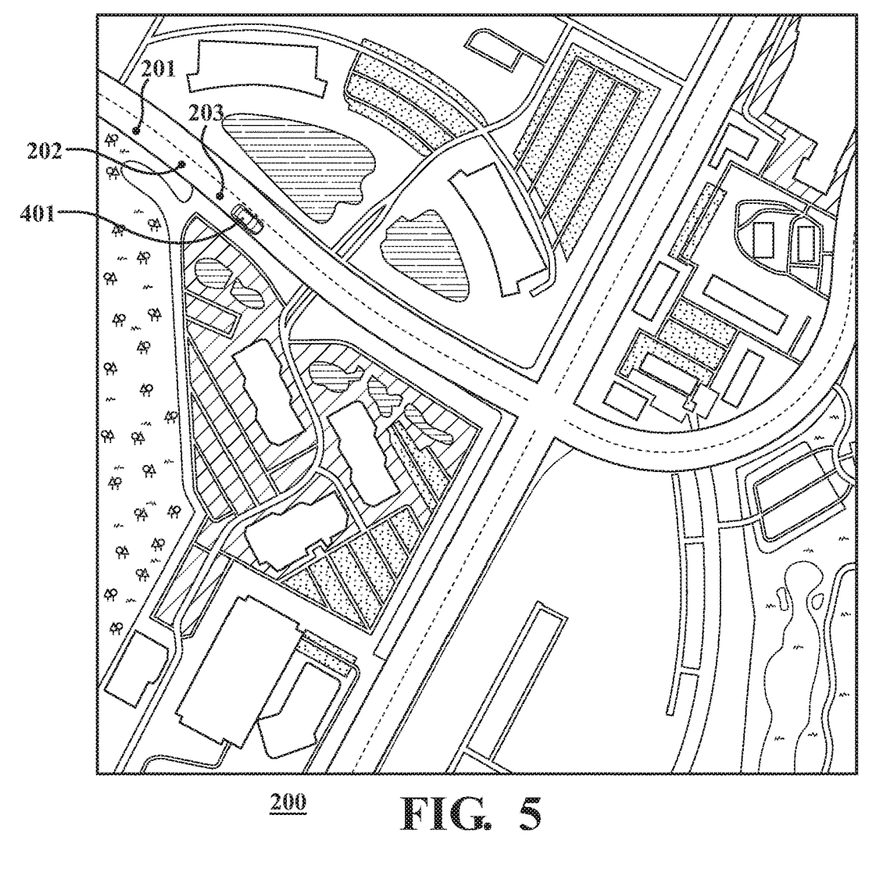
FIG. 5 illustrates an example scenario of a vehicle traveling through a geographic region according to the disclosed subject matter.

FIG. 5 illustrates a vehicle 401 traveling through the mapped area 200 from FIG. 2. In one or more embodiments the vehicle 401 periodically transmits datasets 164 to the georecommendation system 100. For example, the vehicle 401 can transmit datasets 164 on a time cycle (e.g., every ten seconds) or a distance cycle (e.g., every 100 meters). The transmitted datasets 164 can be associated with the location from which they are transmitted. For example, datasets 164 transmitted from locations 201, 202, 203 can include longitude and latitude coordinates corresponding to the respective transmission locations.

Similarly, multiple vehicles (not shown) may traverse the mapped area 200 while periodically transmitting datasets 164 to the georecommendation system 100. Multiple vehicles can transmit datasets 164 from the same or substantially the same locations. In this manner the georecommendation system 100 can obtain a plurality of datasets 164 associated with a given location. For example, a first plurality of datasets 164 can be associated with location 201, a second plurality of datasets 164 can be associated with location 202, and so on. In one or more embodiments, the data module 130 can normalize the location coordinates. For example, the data module 130 can group together all datasets 164 associated with location coordinates within a radius of 100 meters as all being associated with one and the same location.

A dataset 164 can include vehicle descriptive information, such as the make and model of the vehicle, the year it was manufactured, mileage, etc. A dataset 164 can also include feature values that are obtained from the vehicle. The feature values can indicate a status of one or more features of the vehicle and can include, for example, one or more of engine speed (e.g., in RPM), individual wheel speeds, fuel consumption rate, lane detection information (e.g., white line crossing), steering angle, steering angle speed, acceleration, driving mode (e.g., sport mode, snow mode, eco mode, etc.), percent value of gas pedal depression, percent value of brake pedal depression, gear setting, window status (e.g., raised or lowered), and other features. The feature values can be used to determine actions executed by the vehicle, for example, based on the feature values or changes to the feature values.

The exact composition of the dataset 164 can depend on a desired implementation of the georecommendation system 100, e.g., tailored to obtain select intelligence, as well as on available features per vehicle. For example, in one implementation the dataset 164 can include features limited to one or more of vehicle descriptive information, vehicle speed, vehicle acceleration, steering angle, and steering angle speed. In another implementation the dataset 164 can include features limited to one or more of vehicle descriptive information, driving mode, and brake pedal depression, and so on.

In one or more embodiments, the data module 130 can process a received dataset 164 to include additional data based on the information included in the dataset 164. For example, the data module 130 can analyze the vehicle description information (make, model, year, mileage) to determine an original cost value for the vehicle, an age, and a present estimated value. As another example the data module 130 can analyze one or more feature values to determine a rating value or a label. The data module 130 can store these determinations as metadata associated with the dataset 164 or can include the determinations as part of the dataset 164.

As discussed above, the data module 130 can combine multiple datasets 164 obtained from a location with to create a location tensor 166 and store the location tensor 166 in the database 160 in association with the terrain matrix 162 associated with the location. The data module 130 can create the location tensors 166 as multi-dimensional data structures that include information from multiple datasets 164 associated with a given location over a predetermined amount of time, e.g., one hour, one week, one month, etc. The dimensions of the location tensor 166 can be determined, for example, based at least in part on a number of samples, number of time steps, and/or number of features.

For example, at one location, for one hour, 1,000 datasets 164 may be obtained. Each dataset 164 can include ten different features. The location tensor 166 can be formed having dimensions of 1,000 (datasets)×60 (per minute)×10 (features). The location tensor 166 can be assigned a single timestamp (e.g., 1:00 PM) and associated with the location.

The data module 130 may create location tensors 166 that are large, high dimension data structures, which can result in high computational costs, for example, when attempting complex analysis across large numbers of location tensors 166. The encoding module 140 can encode location tensors 166 to extract dense embedding data 168 that represent the location tensors 166 and that have lower computation processing costs. In one or more embodiments, the encoding module 140 can use an autoencoder neural network to extract the embedding data 168 such that the embedding data 168 indicate information that is contained in the location tensor 166.

Figure 6:
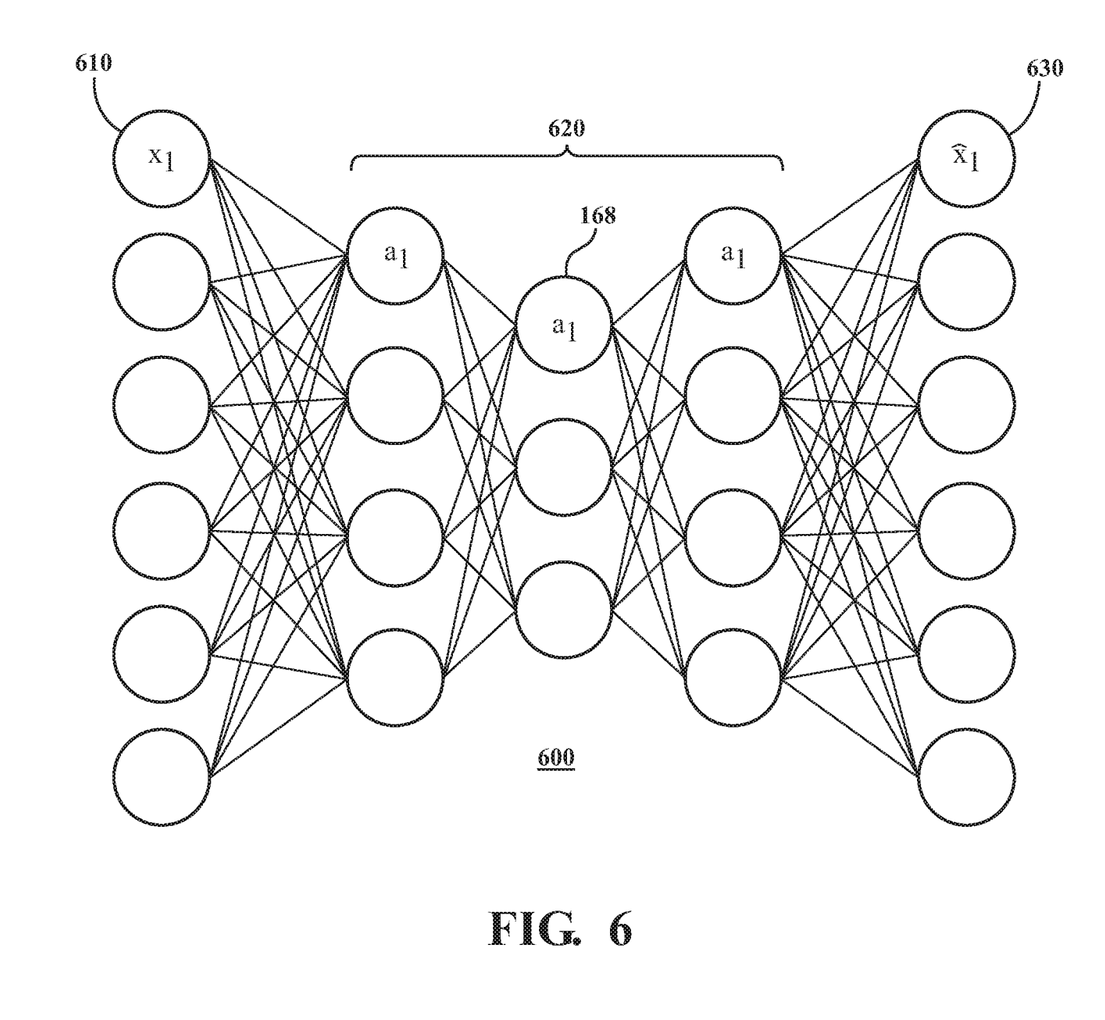
FIG. 6 illustrates an example autoencoder network architecture according to the disclosed subject matter.

FIG. 6 illustrates an example architecture of an autoencoder neural network 600 that the encoding module 140 can use to extract an embedding 168 from a location tensor 166. The network 600 includes an input layer 610, one or more hidden layers 620 and an output layer 630. The network 600 is shown having three hidden layers 620, however, in an implementation a greater number of hidden layers 620 may exist. The network 600 can receive an input x having multiple dimensions (1, 2 . . . ) and reduce the dimensionality by compressing the data as it passes through the network 600.

After the input data has been compressed, the network 600 attempts to reconstruct the original input x from the compressed data a. To improve accuracy of representation of the compressed data a, the network 600 can be trained to reduce a loss function between the output x̂ and the input x. The network 600 therefore can learn an improved model that better captures relationships in the data. By training the network 600 to reduce the loss function, the compressed data can achieve a dense representative data structure that is more accurate than less precise techniques to reduce large datasets 164 and obtain representative values, such as determining mean or median values.

In one or more embodiments, the encoder module 140 extracts the embedding data 168 from a layer in the hidden layers 620 at which the input data dimensionality has been reduced to the greatest extent within the network 600. The embedding data 168 indicate the information about the associated location in a condensed form that is more suitable for processing, for example, to identify patterns or trends that may exist in a given area, for comparing one area to another or other types of analysis. The encoder module 140 can store the embedding 168 in association with any available labels (e.g., POI label, terrain attribute label) associated with the constituent data of the embedding 168.

In one or more embodiments, the recommendation module 150 can identify one or more attributes in a query and search for a labeled embedding 168 that includes the attribute(s). The attribute(s) can be one or more of terrain features (e.g., forest, river, etc.), POIs (e.g., store, gas station, playground, etc.), or vehicle action characterizations (e.g., fast drivers, slow drivers, etc.). In some situations the query can include a combination of attributes that is not explicitly labeled. For example, a query may request a shopping store in an area with trees. As discussed above, the data module 130 can include a trained neural network to determine labels to apply to terrain attributes. However, no practical training set is likely to cover all possible combinations of terrain attributes. Furthermore, requests for recommendations that combine multiple attribute types may be too acute to have received an explicit label, such as a request for a specific POI, e.g., Store X, in an area with trees (specific terrain attribute), where cars drive slowly (specific vehicle action attribute).

In one or more embodiments, when the recommendation module 150 is unable to find an explicitly labeled location that matches a query request, the recommendation module 150 can predict or estimate an embedding 168 that would include the requested attributes and search for a closest match.

Figure 7:
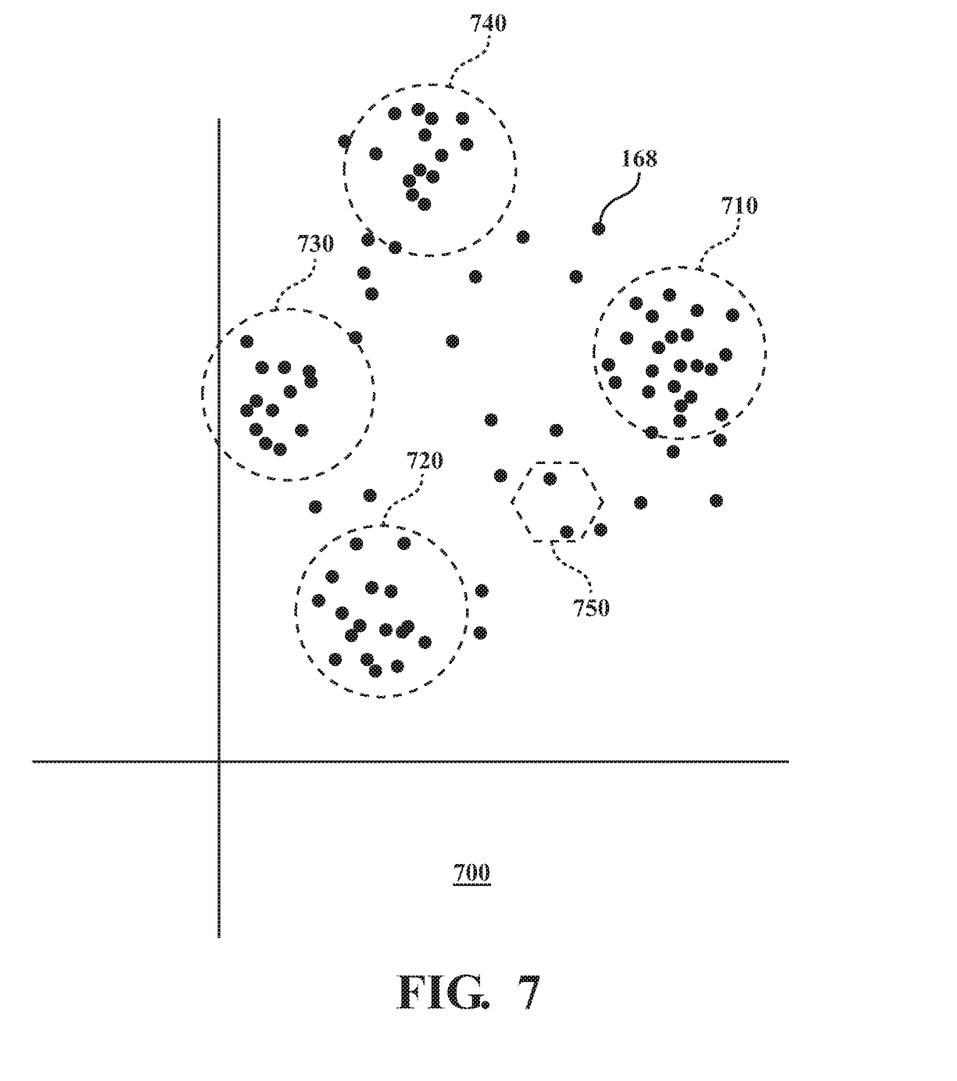
FIG. 7 illustrates an example datapoint graph according to the disclosed subject matter.

For example, in one or more embodiments the recommendation module 150 can represent the embeddings 168 as datapoints in a data space and execute a clustering algorithm on the embeddings 168. FIG. 7 shows an example graph 700 in which each datapoint represents an embedding 168. Several clusters 710, 720, 730, 740, emerge as a result of the clustering algorithm. Each cluster 710, 720, 730, 740, can each represent a given attribute. For example, cluster 710 may include embeddings 168 that share a type of forest attribute, cluster 720 may include embeddings 168 that share a variation of a slow-driving vehicles attribute, and so on. Datapoints that do not fall within any of the clusters 710, 720, 730, 740, represent embeddings 168 that may include multiple attributes.

The recommendation module 150 can identify which clusters represent the desired attributes requested in the query and use a distance metric to determine a region in the data space that is equidistance between the identified clusters. For example, the region can be disposed at a position equidistance between the midpoints of two or more clusters. As an example, in a query $Q_1$ requesting a store that is near a forest (cluster 710) and where cars tend to drive slowly (cluster 720), the recommendation module 150 can determine region 750 as being equidistance between the midpoints of clusters 710 and 720. Datapoints that fall within the region 750 likely represent embeddings 168 that include attributes of both clusters 710 and 720.

The recommendation module 150 can first check whether any of the embeddings 168 corresponding to datapoints in the region 750 are responsive to the query $Q_1$. If any are, the recommendation module 150 can return the corresponding embedding 168 as part of a recommendation in response to the query $Q_1$. If none of the embeddings 168 corresponding to datapoints in the region 750 are responsive to the query $Q_1$, the recommendation module 150 can search for one or more datapoints that are the nearest neighbor to the region 750 and return the corresponding nearest embedding 168 as part of a recommendation.

Although the example query $Q_1$ included two attributes, the recommendation module 150 can use the same approach for a query including three or more attributes. Furthermore, in one or more embodiments the recommendation module 150 can evaluate two or more nearest neighbors to identify multiple best matches responsive to the query.

In one or more embodiments, instead of using the equidistance region approach, the recommendation module 150 can directly generate an estimate embedding based on one or more embeddings 168 that include one or more of the desired attributes. For example, to generate the estimate embedding the recommendation module 150 can calculate the square root of the summed squares of embeddings 168 that include the individual requested attributes. Applied to the query $Q_1$, which requested a store that is near a forest (cluster 710) and where cars tend to drive slowly (cluster 720), the recommendation module 150 can select a first embedding x from cluster 710 and a second embedding y from cluster 720 and calculate the estimate embedding E as:

$$E = \sqrt{x^2 + y^2} \quad \text{(Eq. 1)}$$

The estimate embedding E provides a prediction of an embedding 168 that includes both attributes associated with clusters 710 and 720. The recommendation module 150 can represent the stored embeddings 168 and the estimate embedding E as a plurality of datapoints in a data space and evaluate one or more embeddings 168 corresponding to datapoints that are nearest neighbors to the datapoint of the estimate embedding E to select a best match that is responsive to the query. Although the example query $Q_1$ included two attributes and a combination of attributes (addition), the recommendation module 150 can use the same approach for a query including three or more attributes and can implement exclusion of attributes (subtraction).

The recommendation module 150 can generate a recommendation for a route or a destination that includes or excludes attributes received in a query. For example, when a query requests a recommendation for a destination including two specific attributes (e.g., a shopping area with no trees), the recommendation module 150 can analyze the embedding data 168 to locate one or more destinations that match the request and generate a recommendation based on the results. In another example, when a query requests a recommendation for a route that includes two specific attributes (e.g., passes by a lake and has slow drivers), the recommendation module 150 can analyze the embedding data 168 along one or more possible routes to determine a route that matches the request.

Figure 8:
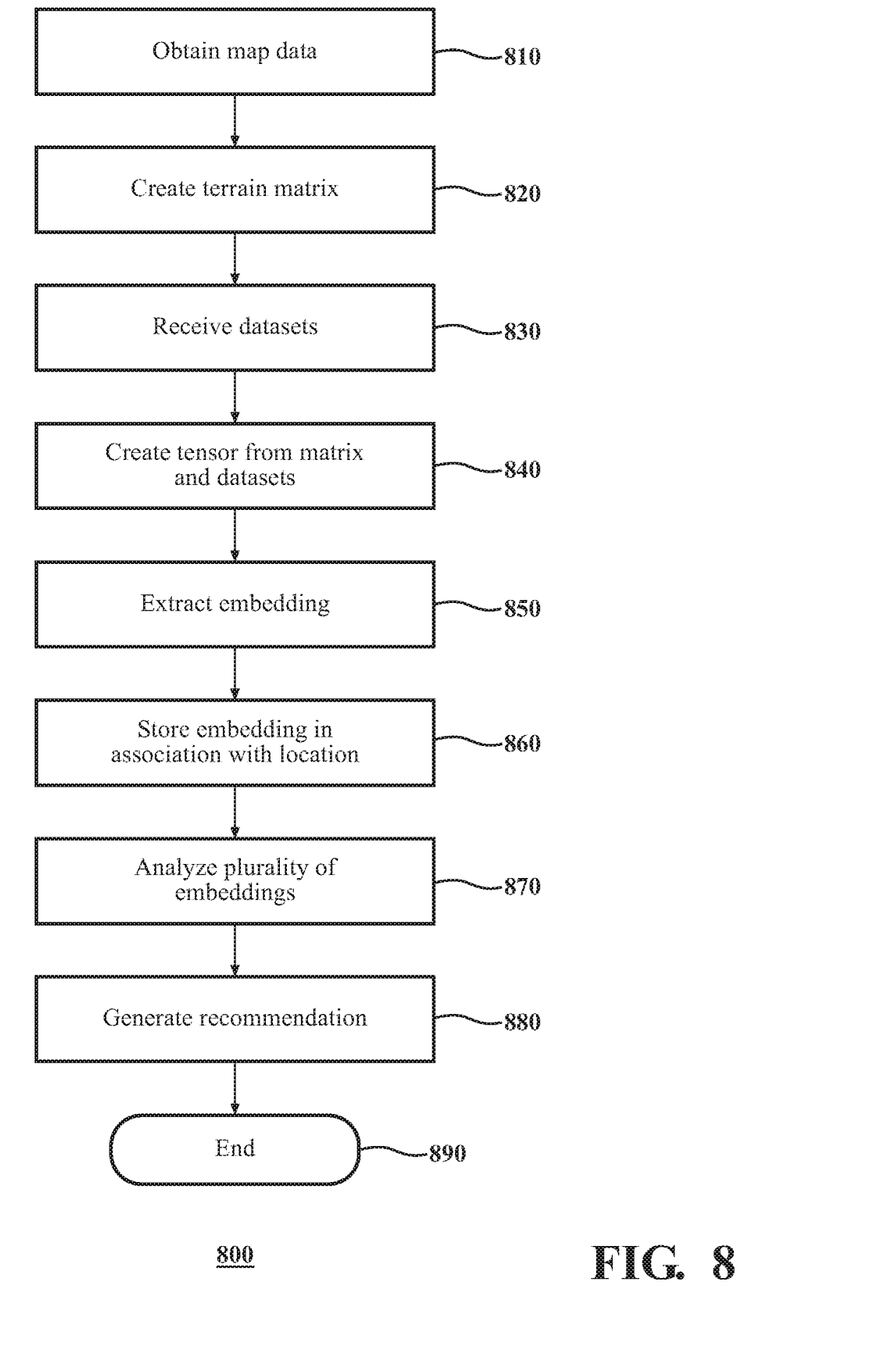
FIG. 8 illustrates a flow chart of a method of controlling a georecommendation system according to the disclosed subject matter.

FIG. 8 illustrates a flowchart of an example method 800 that is associated with operations of the disclosed georecommendation system 100. The method 800 will be discussed from the perspective of the disclosed georecommendation system 100 of FIGS. 1-7. While the method 800 is discussed in combination with the system 100, it should be appreciated that the method 800 is not limited to being implemented within system 100, which is merely one example of a system that may implement the method 800. Furthermore, one of ordinary skill in the art will recognize that the method 800 is merely one example method of implementing the disclosed embodiments. Different variations may be constructed according to implementation in a given setting or situation.

At operation 810 the georecommendation system 100 (e.g., data module 130) obtains, from a map, a section of rasterized image data associated with a geographical location.

At operation 820 the data module 130 converts the rasterized image data into a multidimensional terrain matrix 162.

At operation 830 the data module 130 receives datasets 164 from vehicles. For example, vehicles traveling within a given region (e.g., a neighborhood, a town, a city, a county, within a predetermined geographical boundary, etc.) can transmit datasets 164 to the georecommendation system 100 over a period of time. Each dataset 164 can have an associated geographic coordinate. The data module 130 can normalize the coordinates or group local coordinates together under one location, for example, within a 100-meter radius. Among the datasets 164, multiple datasets 164 can be associated with the same geographic coordinates and/or a same geographic location.

Each dataset 164 can include vehicle descriptive information that describes one or more aspects of the transmitting vehicle (e.g., make, model, manufacturing year, mileage, etc.) and/or feature data that indicates a status of at least one feature of the transmitting vehicle. The exact contents of a dataset 164 can depend upon an implementation of the georecommendation system 100 (e.g., according to preselected features to be included in the datasets 164) or capability of the vehicle (e.g., according to which features the vehicle is capable of detecting and transmitting a status value for). In one or more embodiments, the feature data can include at least a minimum and maximum sensor value, per sensor of one or more sensors installed in the respective vehicle, over a predetermined time window.

At operation 840 the data module 130 creates a multidimensional location tensor 166 that combines information from the multidimensional terrain matrix 162 with multiple datasets 164 associated with a particular location. For example, the data module 130 can create the location tensor 166 to include all datasets 164 at a selected location that span a selected time period, e.g., one hour, one day, one week, etc. Accordingly, the data module 130 can generate a location tensor 166 associated with a geographical location, the location tensor 166 being a multidimensional datastructure that indicates one or more attributes of the geographical location. Furthermore, the data module 130 can create multiple location tensors 166, for example, to cover a selected geographic region, such as a neighborhood, a city, etc.

At operation 850 the georecommendation system 100 (e.g., the encoding module 140) extracts, from a location tensor 166, an embedding 168 that indicates information contained in the location tensor 166. In one or more embodiments, the encoding module 140 inputs the location tensor 166 into an autoencoder neural network that compresses the location tensor 166 in one or more hidden layers and extracts the embedding 168 from one of the one or more hidden layers at which a greatest reduction occurs.

At operation 860 the encoding module 140 stores the embedding 168 in the database 160 in association with the location of the location tensor 166. The georecommendation system 100 can repeat the process of extracting and storing embeddings 168 across a geographic region (e.g., a neighborhood, a town, a metropolitan area, a state, etc.), thereby storing a plurality of embeddings 168.

At operation 870 the georecommendation system 100 (e.g., the recommendation module 150) analyzes a plurality of embeddings 168 generated by the encoding module 140 to identify at least one geographic area having attributes that correspond with the one or more requested attributes. The plurality of embeddings 168 can be associated with locations in a selected geographic region. The one or more requested attributes can be received, for example, in a query requesting a recommendation for a destination or a route having particular attributes. For example, a query can request a recommendation for a park near a lake where cars drive slowly, or directions to a store along a route that avoids grassy fields so as to avoid allergy issues.

In one or more embodiments the analysis can include representing the plurality of embeddings 168 as a plurality of datapoints in a dataspace and executing a clustering algorithm to classify the plurality of datapoints into at least a first clusters of datapoints having at least one similar first attribute and a second cluster of datapoints having at least one similar second attribute, the first attribute and the second attribute being of the at least two requested attributes. The analysis can further include determining a region in the dataspace that is equidistance from the first cluster of datapoints and the second cluster of datapoints, selecting an embedding 168 that corresponds with a datapoint in the region of the dataspace, identifying the at least one geographic area based on the selected embedding 168, and executing a clustering algorithm to classify the plurality of embeddings 168 into one or more groups of embeddings 168 that have one or more similar characteristics.

In one or more embodiments the analysis can include generating an estimate embedding based on one or more embeddings 168 in the database 160 created by the encoding module 140 that include one or more of the requested attributes, representing the plurality of embeddings 168 and the estimated embedding as a plurality of datapoints in a dataspace, selecting one or more embeddings 168 that correspond with datapoints that are nearest neighbors to a datapoint corresponding to the estimated embedding, and identifying the at least one geographic area based on the selected embedding 168.

In any case, at operation 880 the recommendation module 150 can generate a recommendation that includes the at least one geographic area. For example, the recommendation module 150 can recommend a destination or a route that includes the attributes requested in the query. The process ends at 890.

Accordingly, the disclosed georecommendation system 100 can advantageously generate embeddings 168 that represent attributes of geographic locations and analyze the embeddings 168 to provide a recommendation to an attributes-based request. The disclosed embodiments provide ways for a user to request recommendations for destinations or routes that are more suited to the needs of the user and can lead to discovery of new locations and/or paths that are more beneficial to the user.

In addition to the above described configurations, it should be appreciated that the georecommendation system 100 from FIG. 1 can be configured in various arrangements with separate integrated circuits and/or chips. In such embodiments, the data module 130, encoding module 140 and recommendation module 150 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140 and 150 may be combined into a separate application-specific integrated circuit. In further embodiments, portions of the functionality associated with the modules 130, 140 and 150 may be embodied as firmware executable by a processor and stored in a non-transitory memory. In still further embodiments, the modules 130, 140 and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 800 of FIG. 8) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

As previously described, the georecommendation system 100 can include one or more processors 110. In one or more arrangements, the processor(s) 110 can be a main processor of the georecommendation system 100. For instance, the processor(s) 110 can be an electronic control unit (ECU). The georecommendation system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A georecommendation system that generates a recommendation responsive to one or more requested attributes, comprising:
one or more processors; and
a memory communicably connected to the one or more processors and storing:
a data module including one or more instructions that, when executed by the one or more processors, cause the one or more processors to generate a location tensor associated with a geographical location, the location tensor being a multidimensional datastructure that indicates one or more attributes of the geographical location;
an encoding module including one or more instructions that, when executed by the one or more processors, cause the one or more processors to input the location tensor into an autoencoder neural network that reduces the location tensor in one or more hidden layers, extract an embedding, from one of the one or more hidden layers at which a greatest reduction occurs, that indicates information contained in the location tensor, and store the embedding in a database in association with the geographical location; and
a recommendation module including one or more instructions that, when executed by the one or more processors, cause the one or more processors to analyze a plurality of embeddings in the database created by the encoding module to identify at least one geographic area having attributes that correspond with the one or more requested attributes and generate a recommendation that includes the at least one geographic area.

2. The georecommendation system of claim 1, wherein the data module includes instructions to generate the location tensor by:
obtaining a section of a map associated with the geographical location;
rasterizing the section to produce rasterized image data;
converting the rasterized image data into a multidimensional matrix;
receiving a plurality of datasets from a plurality of vehicles, the datasets being associated with the geographical location and respectively including at least feature data that indicate a status of at least one respective feature of respective vehicles; and combining the plurality of datasets and the multidimensional matrix to form the location tensor associated with the geographical location.

3. The georecommendation system of claim 2, wherein the feature data include at least a minimum sensor value and a maximum sensor value, per sensor of one or more sensors installed in a respective vehicle of the respective vehicles, obtained over a predetermined time window.

4. The georecommendation system of claim 1, wherein the one or more requested attributes are received in a query that includes a request for at least two requested attributes in a recommended destination or a recommended route.

5. The georecommendation system of claim 4, wherein the recommendation module includes instructions to analyze the plurality of embeddings to identify the at least one geographic area by:
representing the plurality of embeddings as a plurality of datapoints in a dataspace;
executing a clustering algorithm to classify the plurality of datapoints into at least a first cluster of datapoints having at least one similar first attribute and a second cluster of datapoints having at least one similar second attribute, the at least one similar first attribute and the at least one similar second attribute being of the at least two requested attributes;
determining a region in the dataspace that is equidistant from the first cluster of datapoints and the second cluster of datapoints;
selecting an embedding, of the plurality of embeddings, that corresponds with a datapoint, of the plurality of datapoints, in the region of the dataspace; and
identifying the at least one geographic area based on the embedding that corresponds with the datapoint.

6. The georecommendation system of claim 4, wherein the recommendation module includes instructions to analyze the plurality of embeddings to identify the at least one geographic area by:
generating an estimate embedding based on one or more of the plurality of embeddings in the database created by the encoding module that include one or more of the requested attributes, the estimate embedding providing a prediction of an embedding associated with all of the one or more of the requested attributes;
representing the plurality of embeddings and the estimate embedding as a plurality of datapoints in a dataspace;
selecting one or more embeddings, of the plurality of embeddings, that correspond with datapoints that are nearest neighbors to a datapoint corresponding to the estimate embedding; and
identifying the at least one geographic area based on the one or more embeddings that correspond with the datapoints.

7. The georecommendation system of claim 1, wherein a computation processing cost of the embedding is less than a computation processing cost of the location tensor.

8. A method of generating a recommendation responsive to one or more requested attributes, comprising:
generating a location tensor associated with a geographical location, the location tensor being a multidimensional datastructure that indicates one or more attributes of the geographical location;
inputting the location tensor into an autoencoder neural network that reduces the location tensor in one or more hidden layers;
extracting an embedding, from one of the one or more hidden layers at which a greatest reduction occurs, that indicates information contained in the location tensor;
storing the embedding in a database in association with the geographical location;
analyzing a plurality of embeddings in the database to identify at least one geographic area having attributes that correspond with the one or more requested attributes; and
generating a recommendation that includes the at least one geographic area.

9. The method of claim 8, wherein the generating the location tensor comprises:
obtaining a section of a map associated with the geographical location;
rasterizing the section to produce rasterized image data;
converting the rasterized image data into a multidimensional matrix;
receiving a plurality of datasets from a plurality of vehicles, the datasets being associated with the geographical location and respectively including at least feature data that indicate a status of at least one respective feature of respective vehicles; and
combining the plurality of datasets and the multidimensional matrix to form the location tensor associated with the geographical location.

10. The method of claim 9, wherein the feature data include at least a minimum sensor value and a maximum sensor value, per sensor of one or more sensors installed in a respective vehicle of the respective vehicles, obtained over a predetermined time window.

11. The method of claim 8, wherein the one or more requested attributes are received in a query that includes a request for at least two requested attributes in a recommended destination or a recommended route.

12. The method of claim 11, wherein the analyzing the plurality of embeddings to identify the at least one geographic area comprises:
representing the plurality of embeddings as a plurality of datapoints in a dataspace;
executing a clustering algorithm to classify the plurality of datapoints into at least a first cluster of datapoints having at least one similar first attribute and a second cluster of datapoints having at least one similar second attribute, the at least one similar first attribute and the at least one similar second attribute being of the at least two requested attributes;
determining a region in the dataspace that is equidistant from the first cluster of datapoints and the second cluster of datapoints;
selecting an embedding, of the plurality of embeddings, that corresponds with a datapoint, of the plurality of datapoints, in the region of the dataspace; and
identifying the at least one geographic area based on the embedding that corresponds with the datapoint.

13. The method of claim 11, wherein the analyzing the plurality of embeddings to identify the at least one geographic area comprises:
generating an estimate embedding based on one or more of the plurality of embeddings stored in the database that include one or more of the requested attributes, the estimate embedding providing a prediction of an embedding associated with all of the one or more of the requested attributes;
representing the plurality of embeddings and the estimate embedding as a plurality of datapoints in a dataspace;

selecting one or more embeddings, of the plurality of embeddings, that correspond with datapoints that are nearest neighbors to a datapoint corresponding to the estimate embedding; and identifying the at least one geographic area based on the one or more embeddings that correspond with the datapoints.

14. The method of claim 8, wherein a computation processing cost of the embedding is less than a computation processing cost of the location tensor.

15. A non-transitory computer-readable medium storing instructions for generating a recommendation responsive to one or more requested attributes and that when executed by one or more processors cause the one or more processors to:

generate a location tensor associated with a geographical location, the location tensor being a multidimensional datastructure that indicates one or more attributes of the geographical location;

input the location tensor into an autoencoder neural network that reduces the location tensor in one or more hidden layers;

extract an embedding, from one of the one or more hidden layers at which a greatest reduction occurs, that indicates information contained in the location tensor;

store the embedding in a database in association with the geographical location;

analyze a plurality of embeddings in the database to identify at least one geographic area having attributes that correspond with the one or more requested attributes; and generate a recommendation that includes the at least one geographic area.

16. The non-transitory computer-readable medium of claim 15, wherein the instructions to generate the location tensor include instructions to:

obtain a section of a map associated with the geographical location;

rasterize the section to produce rasterized image data;

convert the rasterized image data into a multidimensional matrix;

receive a plurality of datasets from a plurality of vehicles, the datasets being associated with the geographical location and respectively including at least feature data that indicate a status of at least one respective feature of respective vehicles; and combine the plurality of datasets and the multidimensional matrix to form the location tensor associated with the geographical location.

17. The non-transitory computer-readable medium of claim 16, wherein the feature data include at least a minimum sensor value and a maximum sensor value, per sensor of one or more sensors installed in a respective vehicle of the respective vehicles, obtained over a predetermined time window.

18. The non-transitory computer-readable medium of claim 15, wherein the one or more requested attributes are received in a query that includes a request for at least two requested attributes in a recommended destination or a recommended route.

19. The non-transitory computer-readable medium of claim 18, wherein the instructions to analyze the plurality of embeddings to identify the at least one geographic area include instructions to:

represent the plurality of embeddings as a plurality of datapoints in a dataspace;

execute a clustering algorithm to classify the plurality of datapoints into at least a first cluster of datapoints having at least one similar first attribute and a second cluster of datapoints having at least one similar second attribute, the first attribute and the second attribute being of the at least two requested attributes;

determine a region in the dataspace that is equidistance from the first cluster of datapoints, of the plurality of datapoints, and the second cluster of datapoints;

select an embedding, of the plurality of embeddings, that corresponds with a datapoint in the region of the dataspace; and identify the at least one geographic area based on the embedding that corresponds with the datapoint.

20. The non-transitory computer-readable medium of claim 18, wherein the instructions to analyze the plurality of embeddings to identify the at least one geographic area include instructions to:

generate an estimate embedding based on one or more of the plurality of embeddings stored in the database that include one or more of the requested attributes, the estimate embedding providing a prediction of an embedding associated with all of the one or more of the requested attributes;

represent the plurality of embeddings and the estimate embedding as a plurality of datapoints in a dataspace;

select one or more embeddings, of the plurality of embeddings, that correspond with datapoints that are nearest neighbors to a datapoint corresponding to the estimate embedding; and identify the at least one geographic area based on the one or more embeddings that correspond with the datapoints.

* * * * *